United States Patent Office 2,927,839
Patented Mar. 8, 1960

2,927,839

SILOXANE AZO DYESTUFFS

Donald L. Bailey, Snyder, and Ronald M. Pike, Grand Island, N.Y., assignors to Union Carbide Corporation, a corporation of New York No Drawing. Application April 29, 1957
Serial No. 655,507

12 Claims. (Cl. 8—8)

This invention relates to silicon-containing azo dyestuffs and to processes for producing them. More particularly, this invention is concerned with polysiloxane azo dyestuffs.

The siloxane azo dyestuffs of the present invention contain units which can be represented by the following general formula:

$$[R—N=N—Ar—C_aH_{2a}—SiO_c]$$

wherein R represents the residue of a coupling component, as for example, substituted aryl radicals such as phenyl, naphthyl, anthraquinolyl or pyrazolyl radicals; Ar represents an arylene radical such as a phenylene radical and including a substituted phenylene radical; $a$ is an integer having a value of from 0 to about 8 or higher and preferably from 0 to about 4; and $c$ is an integer having a value of 0.5, 1.0 and 1.5. The substituents on the arylene radical may be alkyl radicals, alkoxy radicals, and the like. Among the substituents which may be attached to the aryl radical, R, are halogen atoms, hydroxy, alkoxy, alkyl, sulfo, sulfonamide, unsubstituted arylazo, substituted arylazo, phenyl, nitro, or acylamino radicals, and the like.

The novel siloxane azo dyestuffs herein disclosed and claimed contain the unit represented by the following general formula:

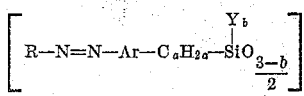

wherein R, Ar and $a$ have the same meanings as hereinbefore indicated; Y represents an alkyl radical such as methyl, ethyl, propyl, and the like; and $b$ is an integer having a value of from 0 to 2.

The valuable polysiloxane dyestuffs of this invention are produced by diazotizing an aminoarylalkoxysilane represented by the general formula:

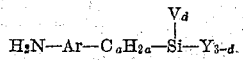

wherein Ar, Y and $a$ have the same meanings as hereinbefore indicated; V represents an alkoxy radical such as methoxy, ethoxy, propoxy, and the like; and $d$ is an integer having a value of from 1 to 3, and coupling the produced diazonium salt with an aromatic coupling component.

The diazotization of the aminoarylalkoxysilane can be carried out in an anhydrous organic solvent medium or in an aqueous medium. In preparing the diazonium salt in an aqueous mixture (Procedure A) the aminoarylalkoxysilane is dissolved or suspended in a cold dilute acid solution, as for example hydrochloric acid, and is then diazotized by method well known in dyestuff technology, for example by the addition of a sodium nitrite solution. When the diazonium salt is prepared in aqueous medium, the functional alkoxy radicals undergo hydrolysis and a siloxane diazonium salt is obtained. The preparation of the diazonium salt in a substantially anhydrous organic medium (Procedure B), that is containing less than about 2% by weight of water, produces a functional diazonium salt. Among the organic solvents suitable for use are dioxane, acetic acid, ethylene glycol, dimethylformamide, and the like. The arylaminoalkoxysilane is dissolved in the solvent, and dry hydrogen chloride gas is bubbled into the solution. The amine may then be diazotized with a solvent solution of sodium nitrite.

After the diazonium salt has been produced by either Procedure A or Procedure B, it is added to the coupling component and the dyestuff is formed by the interreaction of diazonium salt and coupling component. This coupling reaction may be carried out in aqueous medium or under substantially anhydrous conditions. The azo dyestuffs produced will be polysiloxane azo dyestuffs whenever the diazotization, or coupling, or both are carried out in the presence of water. When both diazotization and coupling are carried out under substantially anhydrous conditions, the azo dyestuff produced will be a monomeric functional silane azo dyestuff. These monomeric functional silane azo dyestuffs can then be hydrolyzed, by procedures conventionally used in the hydrolysis of functional silanes, to produce the polysiloxane azo dyestuffs of this invention.

The following compounds are illustrative of the aminoarylalkoxysilanes suitable for use as diazo components in this invention:

1-amino-4-(beta-triethoxysilylethyl)-benzene,
1-amino-4-triethoxysilylbenzene,
1-amino-4-diethoxymethylsilylbenzene,
1-amino-2-methyl-4-(beta-triethoxysilylpropyl)-benzene,
1-amino-4-(gamma-ethoxydimethylsilylpropyl)-benzene,
1-amino-3-(beta-triethoxysilylethyl)-4-methoxybenzene,
1-amino-3-methyl-4-(beta-triethoxysilylethyl)-benzene,
1-amino-4-(beta-diethoxymethylsilylethyl)-benzene,
1-amino-4-ethoxydimethylsilylbenzene, and the like.

The preparation of these aminoarylalkoxysilanes is the subject matter of our copending patent application, Serial No. 655,506, filed April 29, 1957.

As coupling component one can use any aromatic compound capable of coupling. Among the suitable coupling components are the phenols, the anilines, the naphthols, the naphthylamines, the pyrazolones, and the like. Depending on the coupling component selected, one can prepare the metal complex of the dyestuff using the salts of metals such as Cr, Co, Ni, Cu, Mn, Fe, Cd and Sn by methods which are well known in dyestuff technology. Illustrative of the aromatic coupling components suitable in this invention are:

Aniline,
2-methylaniline,
3-methylaniline,
2,5-dimethylaniline,
2-aminobenzene sulfonic acid,
3-aminobenzene sulfonic acid,
2-methoxyaniline,
2-methoxy-5-methylaniline,
2,5-dimethoxyaniline,
2,5-diethoxyaniline,
2-chloro-5-methoxyaniline,
1,3-diaminobenzene,
2,4-diaminotoluene,
2,4-diaminobenzene sulfonic acid,
N,N-dimethylaniline,
N-methylaniline,
Phenol,
Phenol-4-sulfonamide,
Phenol-4-sulfonic acid,
4-acetaminophenol, 4-tert. amylphenol,
3-methoxyphenol,
2-methylphenol,
4-methylphenol,
1,3-dihydroxybenzene,
2-hydroxybenzoic acid,
2-hydroxy-3-methylbenzoic acid,
2-aminophenol,
3-aminophenol,
2-aminophenol-4-sulfonic acid
2-aminophenol-4-sulfonamide,
1-naphthol,
1-hydroxynaphthalene-4-sulfonic acid,
1-hydroxynaphthalene-5-sulfonic acid,
1-hydroxynaphthalene-3,6-disulfonic acid,
1-hydroxynaphthalene-4,8-disulfonic acid,
1,8-dihydroxynaphthalene-4-sulfonic acid,
1,8-dihydroxynaphthalene-3,6-disulfonic acid,
1,5-dihydroxynaphthalene-3,7-disulfonic acid,
2-naphthol,
2-hydroxynaphthalene-6-sulfonic acid,
2-hydroxynaphthalene-3,6-disulfonic acid,
2-hydroxynaphthalene-6,8-disulfonic acid,
1-hydroxy-6-phenylaminonaphthalene-3-sulfonic acid,
1-hydroxy-8-acetaminonaphthalene-3,6-disulfonic acid,
1-hydroxy-6-acetaminonaphthalene-4-sulfonic acid,
1-naphthylamine,
1-aminonaphthalene-4-sulfonic acid,
1-aminonaphthalene-6-sulfonic acid,
1-aminonaphthalene-3,6-disulfonic acid,
2-naphthylamine,
2-aminonaphthalene-6-sulfonic acid,
1-amino-8-hydroxynaphthalene-4-sulfonic acid,
2-amino-5-hydroxynaphthalene-7-sulfonic acid,
2-amino-8-hydroxynaphthalene-6-sulfonic acid,
1-amino-8-hydroxynaphthalene-3,6-disulfonic acid,
1-amino-8-hydroxynaphthalene-2,4-disulfonic acid,
2-amino-8-hydroxynaphthalene-3,6-disulfonic acid,
Benzoylacetonitrile,
Acetoacetanilide,
1-phenyl-3-methyl-5-pyrazolone,
1-(3'-chlorophenyl)-3-methyl-5-pyrazolone,
1-(4'-sulfophenyl)-3-methyl-5-pyrazolone,
1-(4'-sulfophenyl)-5-pyrazolone-3-carboxylic acid,
Copper complex of 3-(2', 4'-dihydroxyphenylazo)-4-hydroxybenzenesulfonic acid,
2-methoxy-4-chloroacetoacetanilide,
1-(2'-methyl-4'-amino-5'-methoxyphenylazo)-8-hydroxynaphthalene-3,6-disulfonic acid, and the like.

This enumeration is illustrative of the large number of compounds which can be used as coupling components, and is not to be considered as limitative. As hereinbefore indicated, the coupling is performed by procedures well known in dyestuff technology. The polysiloxane azo dyestuffs are obtained as polymeric type materials. The shades of the azo dyestuffs obtained vary from yellows to oranges, reds, blues, greys and browns; and the color of the dyestuff produced will vary according to the particular components selected to produce the dyestuff.

When the aminoarylalkoxysilane selected as diazo component is a trifunctional alkoxy silane, the azo dyestuffs obtained contain the unit represented by the general formula:

$$[R-N=N-Ar-C_aH_{2a}-SiO_{3/2}]$$

and when the aminoarylalkoxysilane is a difunctional alkoxy silane, the dyestuffs contain the unit represented by the general formula:

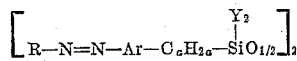

wherein $e$ has a value of at least 3 and may be as high as 7 for cyclic polysiloxanes and higher for linear polysiloxanes, while if the aminoarylalkoxysilane is monofunctional then the azo dyestuffs are the disiloxanes having the general formula:

$$\left[R-N=N-Ar-C_aH_{2a}-\underset{\underset{Y_2}{|}}{Si}O_{1/2}\right]_2$$

The dyestuffs of this invention show some solubility in mixtures of water and organic solvents such as alcohol, acetone and dioxane, and in organic solvents such as alcohols, dimethylformamide and pyridine. The presence of solubilizing groups, such as sulfo or carboxy radicals in the R radical imparts some solubility in water alone. Dyeing can be carried out either from solution, or from suspension, at temperatures above about 25° C., preferably at the boiling point of the dyebath. If desired, the dyeing may be carried out from a dye bath consisting of the dyestuff dissolved in an organic solvent.

The polysiloxane azo dyestuffs of this invention are substantive to natural fibers such as wool, silk and cotton, and also to synthetic fibers such as nylon, Dynel, viscose, acetate, and the like. In addition the polysiloxane dyestuffs of this invention are characterized by the very useful property of dyeing glass cloth and silica from an aqueous dyebath solution, not heretofore possible as far as is known. These dyeings have good wash fastness and other properties. It has also been found that these polysiloxane azo dyestuffs impart some water-repellency to the natural fibers dyed therewith. Satisfactory ink formulations can also be prepared.

The following examples further serve to illustrate the invention.

*Example 1*

There was dissolved 1.55 g. of 1-amino-4-(beta-triethoxysilylethyl)-benzene in a mixture of 3 ml. of water and 3 ml. of 20° Bé. hydrochloric acid. The mixture was cooled to 5° C. and diazotized in the usual manner with a solution of 0.38 g. of sodium nitrite in 5 ml. of water. The pale yellow diazo solution was coupled under ice cooling with a solution of 0.705 g. of 2-naphthol dissolved in 30 ml. of ethanol and containing 3 ml. of 20% by weight sodium hydroxide solution. A red dyestuff was obtained. The reaction mixture was stirred until coupling was completed and the precipitated dyestuff was isolated by filtration. Yield was 1.2 g. of the siloxane dyestuff represented by the following formula:

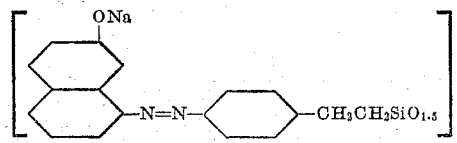

The N:Si ratio found by microanalysis was 2.03:1 as compared to a theoretical value of 2.00:1.

*Example 2*

The polysiloxane azo dyestuff described in Example 1 was prepared using 4.65 g. of 1-amino-4-(beta-triethoxysilylethyl)-benzene and 2.13 g. of 2-naphthol. The wet cake isolated from the coupling reaction was charged to a one liter three-necked flask containing a solution of 110 g. of sodium chloride in 500 ml. of water. The flask was equipped with a stirrer, thermometer, reflux condenser and heating mantle. The reaction mixture in the flask was heated with stirring to 70 to 85° C. and a solution of 8 g. of copper sulfate decahydrate in 55 ml. of water and 52.5 ml. of concentrated aqueous ammonia was added. The whole was then stirred at 85 to 90° C. overnight. The copper complex of the siloxane azo dyestuff so formed was filtered and dried. It was a brown-red powder weighing 7.1 g., and was insoluble in dilute base, but soluble in dilute hydrochloric acid, giving a cherry red colored solution. The Si:Cu ratio found by microanalysis was 2.17:1 as compared to a theoretical value of 2.00:1.

The above siloxane azo dyestuffs were used to dye various fibers from a methanol-pyridine dyebath solution.

| Source Fiber dyed | Color | |
|---|---|---|
| | Example 1 | Example 2 |
| Cotton | Rust-brown, H | Orange-brown, H. |
| Wool | Rose, M | Orange-brown, M. |
| Silk | Rose, L | Orange-brown, M. |
| Nylon | Rose, M | Orange, L. |
| Viscose | Rose, L | Orange-brown, L. |
| Acetate | Orange, M | Orange, H. |
| Glass | Rose, VL | Orange-brown, VL. |

VL=very light shade.
L=light shade.
M=medium shade.
H=heavy shade.

The dyeings could also be performed from an aqueous bath at the boil.

Example 3

There was added 0.1 g. of the siloxane azo dyestuff produced in Example 1 to a mixture of 0.2 g. of sodium carbonate, 3 g. of water and 3 g. of glycerine. The mixture was stirred at room temperature for about 15 minutes, and a red solution was obtained. This solution was filtered, and the filtrate was used to write on paper. After standing in water at room temperature for two days, the ink was removed.

What is claimed is:

1. Polysiloxane azo dyestuffs containing units represented by the general formula:

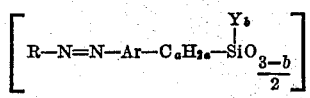

wherein R represents the residue of an aromatic coupling component; Ar represents an arylene radical selected from the group consisting of a phenylene radical, an alkyl substituted phenylene radical and an alkoxy substituted phenylene radical; Y represents a member selected from the group consisting of alkyl radicals; $a$ is an integer having a value of from 0 to about 8; and $b$ is an integer having a value of from 0 to 2.

2. Polysiloxane azo dyestuffs containing the unit represented by the general formula:

$$R-N=N-Ar-C_aH_{2a}-SiO_{3/2}$$

wherein R represents the residue of an aromatic coupling component; Ar represents an arylene radical selected from the group consisting of a phenylene radical, an alkyl substituted phenylene radical and an alkoxy substituted phenylene radical; $a$ is an integer having a value of from 0 to about 8.

3. Polysiloxane azo dyestuffs containing the unit represented by the general formula:

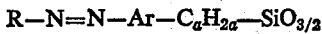

wherein R represents the residue of an aromatic coupling component; Ar represents an arylene radical selected from the group consisting of a phenylene radical, an alkyl substituted phenylene radical and an alkoxy substituted phenylene radical; Y represents a member selected from the group consisting of alkyl radicals; $a$ is an integer having a value of from 0 to about 8.

4. Polysiloxane azo dyestuffs represented by the general formula:

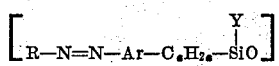

wherein R represents the residue of an aromatic coupling component; Ar represents an arylene radical selected from the group consisting of a phenylene radical, an alkyl substituted phenylene radical and an alkoxy substituted phenylene radical; Y represents a member selected from the group consisting of alkyl radicals; $a$ is an integer having a value of from 0 to about 8.

5. The polysiloxane azo dyestuff containing units represented in the free acid form by the formula:

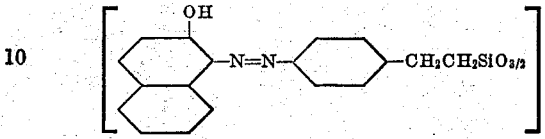

6. The metallized polysiloxane azo dyestuff containing units represented by the formula:

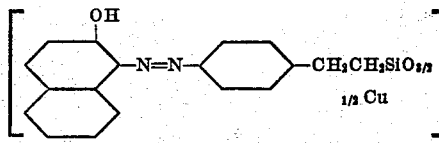

7. The polysiloxane azo dyestuff containing units represented by the formula:

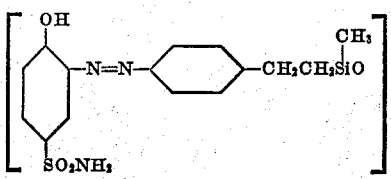

8. The disiloxane azo dyestuff represented by the formula:

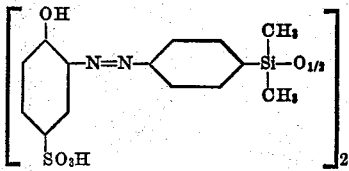

9. The method of dyeing fibrous material, which comprises exposing said fibrous material to a dye bath containing a siloxane azo dyestuff containing units represented by the general formula:

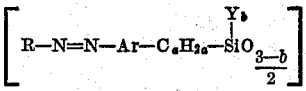

wherein R represents the residue of an aromatic coupling component; Ar represents an arylene radical selected from the group consisting of alkyl radicals; $a$ is an alkyl substituted phenylene radical and an alkoxy substituted phenylene radical; Y represents a member selected from the group consisting of alkyl radicals; $a$ is an integer having a value of from 0 to about 8; and $b$ is an integer having a value of from 0 to 2, at an elevated temperature, rinsing, and drying.

10. A fiber dyed with a siloxane azo dyestuff of claim 1.

11. Glass fiber dyed with a siloxane azo dyestuff of claim 1.

12. Silica dyed with the polysiloxane azo dyestuffs of claim 1.

References Cited in the file of this patent

UNITED STATES PATENTS

| | | |
|---|---|---|
| 2,029,568 | Jaeck | Feb. 4, 1936 |
| 2,317,965 | Bestian | Apr. 27, 1943 |
| 2,715,133 | Speier | Aug. 9, 1955 |
| 2,778,746 | Steinman | Jan. 22, 1957 |
| 2,832,754 | Jex | Apr. 29, 1958 |
| 2,849,333 | Kingsbury | Aug. 26, 1958 |

UNITED STATES PATENT OFFICE
CERTIFICATE OF CORRECTION

Patent No. 2,927,839                                          March 8, 1960

Donald L. Bailey et al.

It is hereby certified that error appears in the printed specification of the above numbered patent requiring correction and that the said Letters Patent should read as corrected below.

Column 6, line 52, for "alkyl radicals; a is" read -- a phenylene radical, --.

Signed and sealed this 6th day of September 1960.

(SEAL)
Attest:
ERNEST W. SWIDER
Attesting Officer

ROBERT C. WATSON
Commissioner of Patents